(12) United States Patent
Skhisov et al.

(10) Patent No.: US 10,441,848 B1
(45) Date of Patent: Oct. 15, 2019

(54) SYSTEM FOR AUTOMATIC EVALUATION OF MARTIAL ARTS MOVES

(71) Applicants: Anna Skhisov, Aurora, CO (US); Eduard Skhisov, Aurora, CO (US); Daniel Skhisov, Aurora, CO (US)

(72) Inventors: Anna Skhisov, Aurora, CO (US); Eduard Skhisov, Aurora, CO (US); Daniel Skhisov, Aurora, CO (US)

( * ) Notice: Subject to any disclaimer, the term of this patent is extended or adjusted under 35 U.S.C. 154(b) by 0 days.

(21) Appl. No.: 16/168,959

(22) Filed: Oct. 24, 2018

(51) Int. Cl.
| | | |
|---|---|---|
| *A63B 24/00* | (2006.01) | |
| *G06F 3/01* | (2006.01) | |
| *G01P 3/68* | (2006.01) | |
| *G06N 20/00* | (2019.01) | |

(52) U.S. Cl.
CPC ...... *A63B 24/0006* (2013.01); *A63B 24/0062* (2013.01); *G01P 3/68* (2013.01); *G06F 3/017* (2013.01); *G06N 20/00* (2019.01); *A63B 2024/0012* (2013.01); *A63B 2024/0065* (2013.01); *A63B 2024/0071* (2013.01); *A63B 2244/10* (2013.01)

(58) Field of Classification Search
CPC .............. A63B 69/004; A63B 2220/53; A63B 2220/803; A63B 21/0021; A63B 2024/0068; A63B 2071/0647; A63B 2220/40; A63B 24/0006; A63B 2220/833; A63B 2220/836; G09B 19/0038; A61B 2503/10; A61B 2562/0219; A61B 5/1116
See application file for complete search history.

(56) References Cited

U.S. PATENT DOCUMENTS

| | | | | |
|---|---|---|---|---|
| 5,605,336 A | * | 2/1997 | Gaoiran ................. | A63B 24/00 273/445 |
| 2010/0049468 A1 | * | 2/2010 | Papadourakis ........ | A63B 69/00 702/141 |
| 2012/0052947 A1 | * | 3/2012 | Yun ..................... | G09B 19/0038 463/32 |

* cited by examiner

*Primary Examiner* — Jerry-Daryl Fletcher
(74) *Attorney, Agent, or Firm* — Holland & Hart LLP

(57) ABSTRACT

Methods, systems, and devices for automatically evaluating a martial arts move are described. The method may include identifying a distance between a target and a sensor coupled with a user and receiving motion data from the sensor. The motion data may include linear acceleration data and rotation data. The method may further include calculating, based on the distance and the linear acceleration data, an end point in three-dimensional space of the martial arts move and determining whether the user made contact with the target based on a comparison between the end point and a three-dimensional representant of the target. The method may further include determining a rotational characteristic of the move and comparing the rotational characteristic with a stored model of the move. The method may further include evaluating the move based on whether the user made contact with the target and the comparison of the rotational characteristic.

18 Claims, 7 Drawing Sheets

SYSTEM FOR AUTOMATIC EVALUATION OF MARTIAL ARTS MOVES

BACKGROUND

The following relates generally to gesture recognition and more specifically to systems for automatically evaluating martial arts moves.

Some martial arts competitions are judged based on a point system. For example, a punch landing in a particular region of an opponent might yield a certain number of points, whereas a kick landing in a particular region might yield a different number of points. In addition to whether and where a punch or kick strikes an opponent, the technique of the move may also be judged. For example, a punch that is delivered with proper technique may be awarded points than a punch that strikes the opponent in the proper region, but was delivered with improper technique.

Such scoring metrics are subjective when judged by a human referee. For example, the speed of the moves and nuanced distinctions between proper and improper technique can be difficult to discern during a fast-paced competition. The subjective nature of the scoring leads to inconsistency and ambiguity regarding the winner of such martial arts competitions. In some cases, due to the ambiguity in scoring, a martial arts competition will be stopped after each move so that the referee and coaches from each side can review a recorded replay of the move. The repeated interruptions caused by these reviews slows down the cadence of the fight and degrades the experience for the competitors and viewers. Moreover, in many cases, a fee is charged for the video review, which may be prohibitive to certain competitors.

Some competitive fighting sports use electronic devices affixed to the opponents to assist with the scoring. However, such systems are not suitable for use in certain martial arts competitions (e.g., karate), because such systems can be too bulky, require the competitors to wear vests or similar clothing to register the strikes, lack the sensitivity required to judge the technique of a move, or some combination of these technical deficiencies.

SUMMARY

The described features generally relate to methods, systems, devices, or apparatuses that support automatic evaluation of martial arts moves. A system may include one or more sensors coupled with a user, and the sensors may be configured to measure motion data of the user. Based on this measured motion data, the system may automatically evaluate a martial arts move performed by the user. For example, in a training mode, the system may detect motion data from a sensor worn by a user and calculate acceleration and rotational characteristics of the motion. The acceleration and rotational characteristics may be used by the system to compute whether and where a user struck a target (e.g., a punching bag). These calculated motion characteristics may also be used to compare the motion to a computer-generated model of the motion stored in a memory of the system. Based on this comparison, the system may also evaluate a technique of the martial arts move. For example, the system may assess the technique, by for example comparing the technique to a previously stored model technique, and may assign a score or some other metric to the technique used by the competitor.

A system may also include a camera or similar visual or motion recognition device. The system may use the camera to determine a location of two competitors with respect to each other. This visual data may be combined with sensor data from one or more sensors worn by the competitors to determine, by the system, whether and where a competitor struck an opponent, and whether proper technique was used.

A method of evaluating a martial arts move is described. The method may include identifying a distance between a target and a sensor coupled with a user, receiving motion data from the sensor, where the motion data includes three-dimensional linear acceleration data as a function of time and three-dimensional rotation data as a function of time, calculating, based on the distance and the three-dimensional linear acceleration data, an end point in three-dimensional space of the martial arts move, determining whether the user made contact with the target based on a comparison between the end point and a three-dimensional representation of the target, calculating, based on the rotation data, a rotational characteristic of the martial arts move, comparing the rotational characteristic of the martial arts move to a stored model gesture corresponding to the martial arts move, evaluating the martial arts move based on whether the user made contact with the target and the comparison of the rotational characteristic, and transmitting an indication of the evaluation of the martial arts move.

An apparatus for evaluating a martial arts move is described. The apparatus may include a processor, memory in electronic communication with the processor, and instructions stored in the memory. The instructions may be executable by the processor to cause the apparatus to identify a distance between a target and a sensor coupled with a user, receive motion data from the sensor, where the motion data includes three-dimensional linear acceleration data as a function of time and three-dimensional rotation data as a function of time, calculate, based on the distance and the three-dimensional linear acceleration data, an end point in three-dimensional space of the martial arts move, determine whether the user made contact with the target based on a comparison between the end point and a three-dimensional representation of the target, calculate, based on the rotation data, a rotational characteristic of the martial arts move, compare the rotational characteristic of the martial arts move to a stored model gesture corresponding to the martial arts move, evaluate the martial arts move based on whether the user made contact with the target and the comparison of the rotational characteristic, and transmit an indication of the evaluation of the martial arts move.

Another apparatus for evaluating a martial arts move is described. The apparatus may include means for identifying a distance between a target and a sensor coupled with a user, receiving motion data from the sensor, where the motion data includes three-dimensional linear acceleration data as a function of time and three-dimensional rotation data as a function of time, calculating, based on the distance and the three-dimensional linear acceleration data, an end point in three-dimensional space of the martial arts move, determining whether the user made contact with the target based on a comparison between the end point and a three-dimensional representation of the target, calculating, based on the rotation data, a rotational characteristic of the martial arts move, comparing the rotational characteristic of the martial arts move to a stored model gesture corresponding to the martial arts move, evaluating the martial arts move based on whether the user made contact with the target and the comparison of the rotational characteristic, and transmitting an indication of the evaluation of the martial arts move.

A non-transitory computer-readable medium storing code for evaluating a martial arts move is described. The code may include instructions executable by a processor to identify a distance between a target and a sensor coupled with a user, receive motion data from the sensor, where the motion data includes three-dimensional linear acceleration data as a function of time and three-dimensional rotation data as a function of time, calculate, based on the distance and the three-dimensional linear acceleration data, an end point in three-dimensional space of the martial arts move, determine whether the user made contact with the target based on a comparison between the end point and a three-dimensional representation of the target, calculate, based on the rotation data, a rotational characteristic of the martial arts move, compare the rotational characteristic of the martial arts move to a stored model gesture corresponding to the martial arts move, evaluate the martial arts move based on whether the user made contact with the target and the comparison of the rotational characteristic, and transmit an indication of the evaluation of the martial arts move.

Some examples of the method, apparatuses, and non-transitory computer-readable medium described herein may further include operations, features, means, or instructions for receiving training motion data from a second sensor coupled with an authorized user, where the training motion data includes three-dimensional linear acceleration data as a function of time and three-dimensional rotation data as a function of time, storing a set of sets of training motion data received from the authorized user, analyzing the rotation data from the set of sets of training motion data using a machine learning model and determining the model gesture corresponding to the martial arts move based on the analysis of the rotation data.

Some examples of the method, apparatuses, and non-transitory computer-readable medium described herein may further include operations, features, means, or instructions for determining a contact location on the target based on the end point and the three-dimensional representation of the target.

Some examples of the method, apparatuses, and non-transitory computer-readable medium described herein may further include operations, features, means, or instructions for evaluating the martial arts move may be further based on the contact location on the target.

Some examples of the method, apparatuses, and non-transitory computer-readable medium described herein may further include operations, features, means, or instructions for calculating a force exerted on the target at the contact location based on the linear acceleration data.

Some examples of the method, apparatuses, and non-transitory computer-readable medium described herein may further include operations, features, means, or instructions for evaluating the martial arts move may be further based on the force.

In some examples of the method, apparatuses, and non-transitory computer-readable medium described herein, identifying the distance between the target and the sensor may include operations, features, means, or instructions for receiving a video signal of the user and the target and calculating the distance based on an image analysis of the video signal.

In some examples of the method, apparatuses, and non-transitory computer-readable medium described herein, the target may be a second user, and where the image analysis may be based on a color recognition of clothing worn by the user and the second user.

Some examples of the method, apparatuses, and non-transitory computer-readable medium described herein may further include operations, features, means, or instructions for retrieving the three-dimensional representation of the target from a surface library.

Some examples of the method, apparatuses, and non-transitory computer-readable medium described herein may further include operations, features, means, or instructions for retrieving the stored model gesture from a gesture library.

In some examples of the method, apparatuses, and non-transitory computer-readable medium described herein, the motion data may be received via a wireless data connection.

In some examples of the method, apparatuses, and non-transitory computer-readable medium described herein, the rotation data includes quaternion data.

In some examples of the method, apparatuses, and non-transitory computer-readable medium described herein, the rotational characteristic of the martial arts move includes an indication of a rotational orientation of a hand of the user as a function of time.

In some examples of the method, apparatuses, and non-transitory computer-readable medium described herein, the martial arts move includes a punch, a kick, or a combination thereof.

In some examples of the method, apparatuses, and non-transitory computer-readable medium described herein, the indication of the evaluation of the martial arts move includes a score.

Some examples of the method, apparatuses, and non-transitory computer-readable medium described herein may further include operations, features, means, or instructions for receiving an identification of the user, an identification of the sensor, a timestamp, or a combination thereof.

In some examples of the method, apparatuses, and non-transitory computer-readable medium described herein, the determining whether the user made contact with the target includes a point in polyhedron calculation.

Some examples of the method, apparatuses, and non-transitory computer-readable medium described herein may further include operations, features, means, or instructions for identifying a starting point in three-dimensional space of the martial arts move.

In some examples of the method, apparatuses, and non-transitory computer-readable medium described herein, the sensor includes a nine degree of freedom sensor.

DETAILED DESCRIPTION

Figure 1:
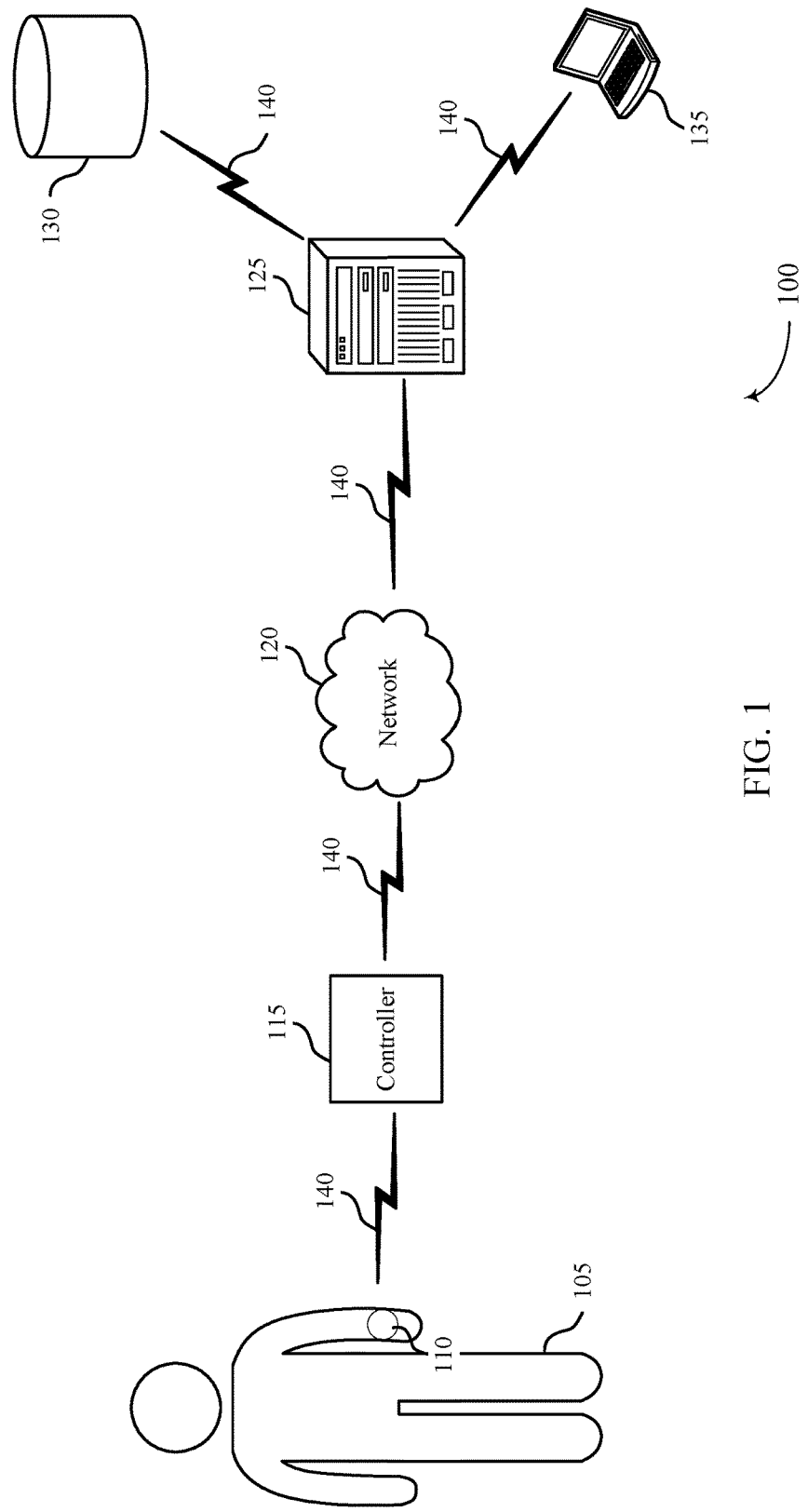
FIG. 1 illustrates an example of a system for automatically evaluating martial arts moves in accordance with aspects of the present disclosure.

A system for automatically evaluating a martial arts move may include one or more sensors worn by a user. For example, a sensor may be embedded in a glove or an instep guard worn by the user. The sensors may be configured to detect motion and process the detected motion data to calculate one or more characteristics of a movement performed by the user. For example, a sensor may detect linear acceleration and may compute from the linear acceleration any of a trajectory, location, speed, or force over the course of a movement. The sensors may also be able to detect and compute rotational characteristics of the movement using quaternion calculations. These calculated characteristics of a user's motion may be used by the system to automatically determine, for example, whether and where a user struck (or nearly struck) an opponent or target, and may evaluate a technique of the motion. The system may use these automatic determinations to assist a user in training for a particular martial arts move, score a competition between two opponents, or both.

Some conventional systems used to automatically score a fighting competition may include piezoelectric sensors or magnets embedded in a vest, armor, or other clothing worn by the competitors. For example, in taekwondo tournaments, opponents may each wear a vest fitted with sensors that can detect the force of an impact using piezoelectric sensors. In other systems, such as those used in some fencing competitions, the opponents may wear vests or clothing with sensors that detect impact by registering contact between the vest and a sensor worn or carried by the opponent. For such systems to work, sensors must be placed on the areas of the body that are being contacted, which require the users to wear vests or similar clothing. Such systems may also require contact to be made between two users for the sensors to register the impact. However, such systems may be unsuitable for scoring fighting competitions where the opponents do not actually strike each other, such as in certain forms of karate where a punch or kick is intended to stop just short of striking the opponent. Moreover, since such conventional systems require sensors to be placed on a region of the user to detect impacts in that region, such systems are unsuitable for sports where vests or other types of bulky clothing are not worn by the opponents.

Therefore, in accordance with aspects of the present disclosure, a system may be configured to detect and evaluate a martial arts move without the need for physical contact between the two opponents and/or without the need for sensors to be worn by an opponent to detect the impact. Such an improved system may include, for example, a nine degree-of-freedom (DOF) sensor, including some combination of an accelerometer, a magnetometer, and a gyroscope. Such a sensor may be embedded within a glove and/or an instep guard of a participant and may be configured to measure linear acceleration and rotational quaternion characteristics of the user's glove. The sensor may either locally compute additional characteristics of the movement using a local microprocessor or may wirelessly transmit the motion data to a separate device for processing, or both. In either case, the system may be configured to evaluate a martial arts move of the participant based on these calculated motion characteristics.

Aspects of the disclosure are initially described in the context of a system for automatically evaluating a martial arts move. Aspects of the disclosure are further illustrated by and described with reference to apparatus diagrams, system architecture diagrams, and flowcharts that relate to automatically evaluating a martial arts move using a system.

FIG. 1 illustrates an example of a system 100 for automatically evaluating martial arts moves in accordance with various aspects of the present disclosure. The system 100 may include a user 105 wearing, carrying, or otherwise coupled with a sensor 110. Although a single sensor 110 is shown, multiple sensors 110 may be coupled to the user 105. The sensor 110 may be imbedded in a glove or instep guard of the user 105.

The sensor 110 may include one or more sensors and corresponding processors that are configured to collect a variety of motion and location information. For example, the sensor 110 may be a nine DOF sensor. The sensor 110 may be configured to collect any of accelerometry data, quaternion data, magnetometry data, gyroscope data, or GPS data.

The data collected by the sensor 110 may be transmitted to a controller 115 over a wired or wireless link 140. In some examples, the controller 115 is coupled with the user 105 (e.g., also embedded in a glove). Alternatively, the controller 115 may be positioned at a distance from the user 105, and the motion data may be wirelessly transmitted to the controller 115. Data transmission may occur via, for example, frequencies appropriate for a personal area network (such as Bluetooth, Bluetooth Low Energy (BLE), or IR communications) or local (e.g., wireless local area network (WLAN)) or wide area network (WAN) frequencies such as radio frequencies specified by IEEE standards (e.g., IEEE 802.15.4 standard, IEEE 802.11 standard (Wi-Fi), IEEE 802.16 standard (WiMAX), etc.).

The controller 115 may be or may include one or more processors configured to process the motion data from the sensor 110. For example, the controller 115 may perform integration on linear acceleration data to derive trajectory, velocity, and/or location information of the sensor 110 as a function of time. Controller 115 may also perform smoothing operations to the data to filter out noise, perform conversion operations on the data, or other similar mathematical operations. Some or all of the operations of the controller 115 may be performed by a processor of the sensor 110, or the operations may be split between the sensor 110 and the controller 115. The controller 115 may be configured to wirelessly transmit data to a server 125 either directly or over a network 120. The network 120 may be the Internet or some other network (e.g., a personal WLAN network).

The server 125 may be a computer that performs additional processing of the data from the sensor 110. In some cases, the server 125 may process the raw data in the event that the sensor 110 and/or the controller 115 did not process the raw data. The server 125 may collect linear acceleration data from the sensor 110 and may computer a trajectory of the sensor as a function of time. The server 125 may then determine a starting and ending location of the sensor 110 in real time. The server 125 may perform a point in polyhedron (PIP) calculation to determine whether and where the user 105 struck a target. In some cases, the server 125 may use the PIP calculation to determine whether the user 105 came within a threshold distance of the target (e.g., nearly striking the target), in the case where the user 105 purposefully stops the motion just short of striking the target.

The PIP calculation may include retrieving a three-dimensional representation or model of the target from a database 130. The server 125 may perform these computations in real time. The server 125 may wirelessly transmit data to a remote computing device 135. For example, the server 125 may determine that a punching bag or an opponent was struck and may transmit an indication of this hit to the remote computing device 135. Additionally or alternatively, the server 125 may evaluate a technique of a martial arts move of the user 105 and may transmit an indication or scoring of this technique to the remote computing device 135. The remote computing device 135 may be running an application that calculates a score based on the strike or technique evaluation.

In some examples, the server 125 may be configured to perform gesture recognition using machine learning (ML) techniques on training data for subsequent evaluation of martial arts moves. For example, as described in detail with reference to FIG. 2, the server 125 may receive the motion data associated with several repetitions of a particular martial arts move, and may build a computer-generated model of that move using ML techniques (e.g., pattern recognition techniques). These models of the training data may be stored in database 130. The server 125 may be configured to receive motion data for a move of the user 105 and compare that data to the model previously built for that move to assess a technique of the move.

The system 100 may therefore be configured to automatically score and evaluate martial arts moves of a user 105 using one or more sensors 110. By evaluating motion characteristics of the sensor 110, the system may be able to determine whether and where the user 110 struck a target or opponent. The system 100 may make this determination without the need for a sensor or vest worn by the opponent to detect the impact. The system 100 may also be able to determine where the user 105 nearly struck a target or opponent even without contacting the target or opponent, which may be advantageous in the case of certain sports (e.g., karate) where the user 105 may purposefully stop a move just short of striking the opponent. Therefore, system 100 may be used to objectively and accurately score fighting competitions.

Figure 2:
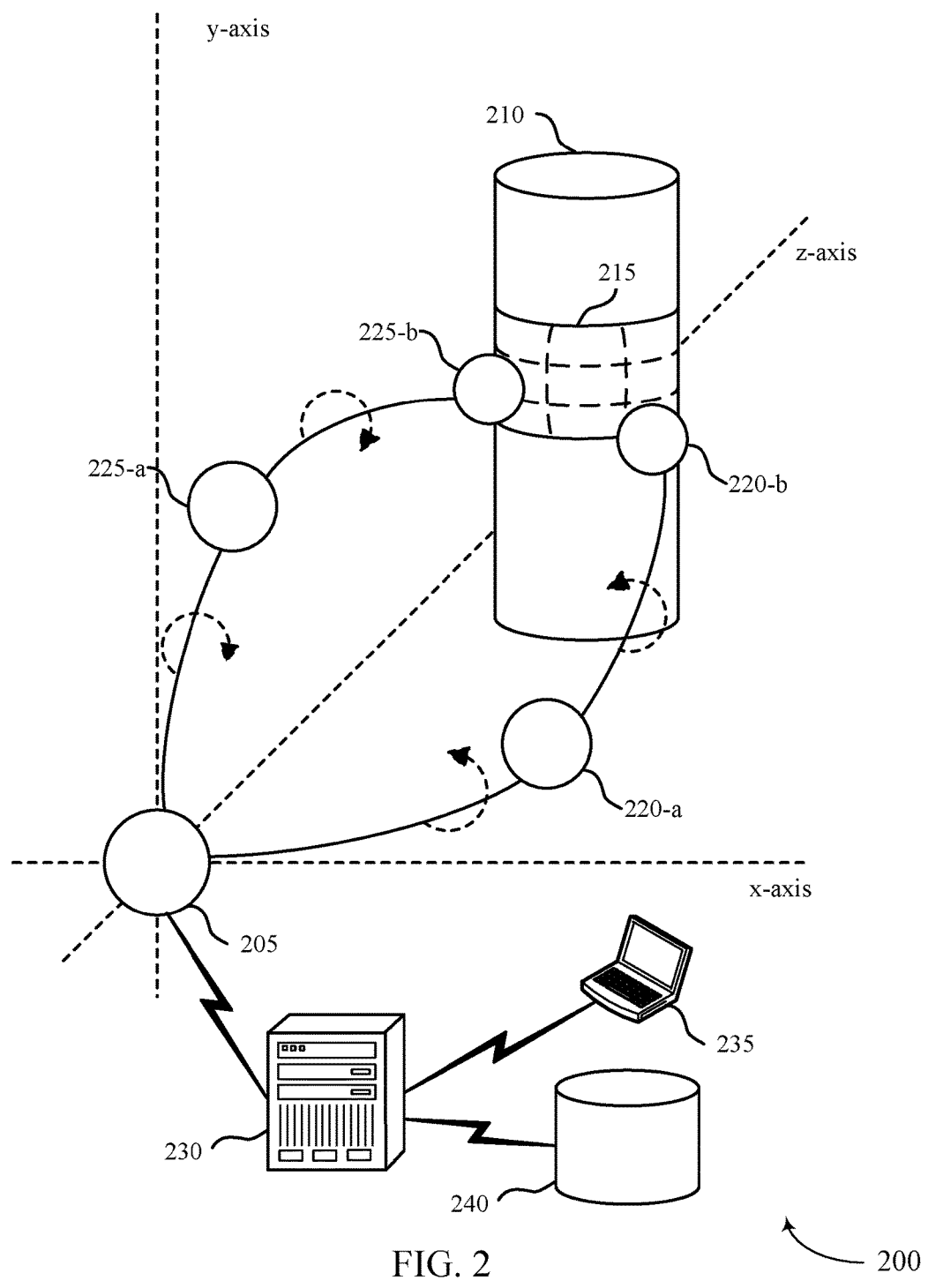
FIG. 2 illustrates an example of a system configured for a training mode and for automatically evaluating martial arts moves in accordance with aspects of the present disclosure.

FIG. 2 illustrates an example of a system 200 that supports automatic evaluation of martial arts moves in accordance with aspects of the present disclosure. The system 200 may include a sensor 205, which may be an example of a sensor 110 as described with reference to FIG. 1. In accordance with aspects of the present disclosure, the system 200 may detect motion (e.g., via linear acceleration and quaternion data) of the sensor 205, and may automatically determine whether the sensor impacted (or nearly impacted) the target 210 (e.g., a punching bag). In addition, the system 200 may evaluate the motion of sensor 205 to determine whether a proper technique was used to impact the target 210.

Before a move has begun, a starting location of the sensor 205 may be predetermined, calculated, or otherwise known. For example, a position of the sensor 205 along an x-axis, y-axis, and z-axis may be determined with respect to the target 210. Based on this starting location of the sensor 205, an initial distance between the sensor 205 and the target 210 may be identified. As the sensor 205 moves towards the target 210, the linear acceleration of the sensor 205 may be calculated as a function of time. From the linear acceleration information, the location of the sensor 205 with respect to its starting position as a function of time may be derived. For example, at time $t_1$, the sensor 205 may be located at the starting location. At time $t_2$, based on the linear acceleration information, the system 200 may determine (e.g., through integration or similar operations) that the sensor 205 is at location 225-$a$. Similarly, at time $t_3$, the system 200 may determine that the sensor 205 is at location 225-$b$. The location 225-$b$ may be an ending location of the move. In some examples, the system 200 may detect a sudden deceleration at location 225-$b$, which may indicate either an impact with target 210, or a purposeful deceleration of the sensor 205 by the user just short of impact.

To assess whether the sensor 205 (or the glove or instep guard within which the sensor 205 may be embedded) has struck the target 210, the system 200 may perform a PIP calculation. For example, the three-dimensional boundary of the target 210 with respect to the x-axis, y-axis, and z-axis may have been predetermined and stored in the server 230 and/or the database 240. This three-dimensional boundary may be represented as a polyhedron in space. As such, the system 200 may determine whether the location 225-$b$ of the sensor 205 is within (or on a boundary of) the polyhedron representing the target 210 by comparing the ending point of the move to the three-dimensional representation of the target 210. In some examples, the target 210 may be divided into zones, such as zone 215. In a similar manner, the system 200 may determine whether the sensor 205 landed within a zone of the target 210, or how far from a zone the sensor 205 landed or ended its motion.

The system 200 may also evaluate rotational motion of the sensor 205 as a function of time throughout the course of a move. For example, at time $t_1$, the sensor 205 may be at a reference or starting angle. At time $t_2$, the sensor 205 at location 220-$a$ may have rotated about the three axes a first amount. Similarly, at time $t_3$, the sensor 205 at location 220-$b$ may have rotated about the three axes a second amount. The system 200 may represent and calculate the rotational characteristics of the sensor 205 using quaternions. Such quaternion calculations may keep track of a total rotational path of the sensor 205 throughout a movement.

In some examples, the system 200 may be configured for a training mode. In a training mode, an experienced user may perform motions (e.g., martial arts moves) repeatedly while the system 200 records the motion characteristics of these moves from the sensor 205. The system 200 may then construct a computer model to represent the proper technique for one or more moves performed by the experienced user. For example, the server 230 may perform gesture recognition using ML techniques to identify patterns in the linear or rotational movement of the stored motions.

For example, a first user (e.g., an expert such as a sensei) wearing the sensor 205 may perform a particular punching move. The system 200 may utilize the linear acceleration data of the sensor 205 to determine, for example, where on the target 210 the first user strikes (or nearly strikes). Other characteristics of the punching move may also be analyzed and recorded from the linear acceleration data, such as the speed of the sensor 205 as a function of time, acceleration as a function of time, and the force of the impact on the target 210.

Similarly, the system 200 may analyze and record the rotational characteristics of the punching move as a function of time based on the recorded quaternion data. Example 5 characteristics that the system 200 may record are the rotational orientation of the sensor 205 at various points over the course of the move, the ending rotational orientation at the time of impacting the target 210, and the speed of rotation at various points over the course of the move.

The system 200 may store the linear acceleration and quaternion information for many repetitions of a particular move (e.g., hundreds of repetitions). The system 200 may utilize machine learning techniques (e.g., ML software) to recognize patterns indicative of a particular move. The system 200 may analyze motion data and create models for many different types of moves (e.g., punches, kicks, etc.).

The system 200 may even be sensitive enough to recognize subtle differences in the same move performed by different users, which can indicate a signature style of a particular master or sensei.

Once the patterns have been analyzed and stored, a second user (e.g., a user in training) wearing the sensor 205 may attempt to perform a particular move. The system 200 may record linear acceleration data and quaternion data to determine whether and where the target 210 was impacted and to determine the rotational characteristics of the move. The system 200 may then compare the move to the prestored model of that move. For example, the system 200 may evaluate statistical variations between the model of the move and the user's move. The system 200 may provide a binary result of whether the move was correct or not (e.g., within a preset statistical variance of the prestored move). In some examples, the system 200 may provide more detailed feedback, and convey what specific characteristics of the move where not correct (e.g., impact location is off, rotation of the hand should occur sooner in the move, acceleration at the beginning of the move should be higher, etc.).

The system 200 may provide this feedback to a user via an application running on a user device 235. For example, the application may record scores for a training session (e.g., based on the motion comparison calculations), provide feedback to a user on how to improve technique, share data and statistics with other uses of the application, etc. In one example, a user may download a computer model of a particular move (e.g., from a renowned sensei) to user device 235 and may train using system 200 to replicate the move.

Figure 3:
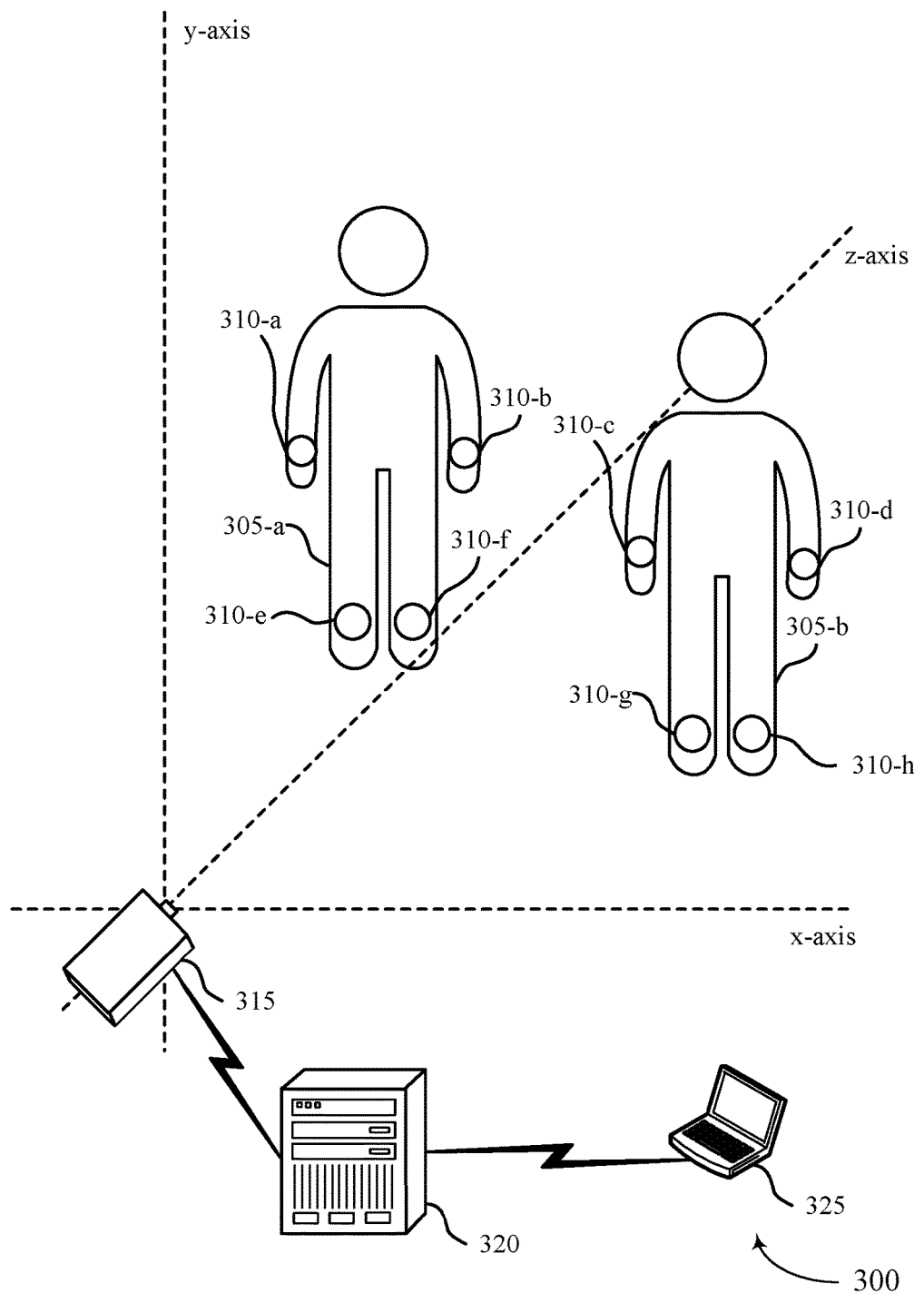
FIG. 3 illustrates an example of a system configured for a competition mode and for automatically evaluating martial arts moves in accordance with aspects of the present disclosure.

FIG. 3 illustrates an example of a system 300 that supports automatic evaluation of martial arts moves in accordance with aspects of the present disclosure. System 300 may include sensors 310-a, 310-b, 310-c, 310-d, 310-e, 310-f, 310-g, and 310-h (or some subset of these sensors) worn by users 305-a and 305-b. The sensors 310 may be examples of a sensor 110 or a sensor 205 described with respect to FIGS. 1 and 2. The system 300 may also include a camera 315. The camera 315 may be an example of any type of video camera, image recognition device, or motion recognition device. The camera 315 may communicate with a server 320 over a wired or wireless link, and the server 320 may perform calculations based on the image or motion data detected by the camera 315. The sensors 310 may also communicate with the server 320 over a wireless connection. The server 320 may transmit data or the results of processed data to a computing device 325 for further processing or for interaction with a user via a user interface.

The system 300 may be configured to evaluate martial arts moves of the users 305-a and 305-b during a competition mode. In contrast with training mode, in competition mode, the distance between the user and target is unknown or may be rapidly changing. As such, the camera 315 may be configured to detect the locations of the users 305 with respect to each other, which may assist the system 300 in determining whether contact was made between the users, and if so, where on the users' body. For example, the system 300 may be configured to determine the distance between the users 305 throughout a competition.

In some examples, the camera 315 may rely on color contrast between the attire of the users 305-a, 305-b and the color of the surroundings (e.g., of the floor or backdrop). In some examples, the users 305-a, 305-b may be wearing gloves or shoes or instep guards of a particular color that the camera 315 can detect. The system 315 may accordingly be able to detect if a glove worn by user 305-a strikes (or comes within a threshold distance of) the body of user 305-b. For example, the system 300 may detect that a blue glove of user 305-a came within a threshold distance of a white shirt worn by user 305-b. In some examples, the users 305 may wear various sensors or certain materials that the camera 315 can detect to accurately determine the location of the users 305 with respect to each other. The camera 315 may then relay this information back to the server 320 for further processing.

The sensors 310 may also be able to calculate rotational information based on quaternion data as described with reference to FIGS. 1 and 2. As such, the system 300 may be configured to combine the determination that an impact was made, where the impact was on a body of a user 305, and whether proper technique was used in performing the move, utilizing the techniques described with reference to FIG. 2.

The system of FIG. 3 may also be adapted for use in a training mode, as described with reference to FIG. 2. For example, the camera 315 may be used to record a user training with a punching bag, and the camera 315 and the corresponding image processing analysis may be configured to determine a starting distance between the user and the punching bag.

Figure 4:
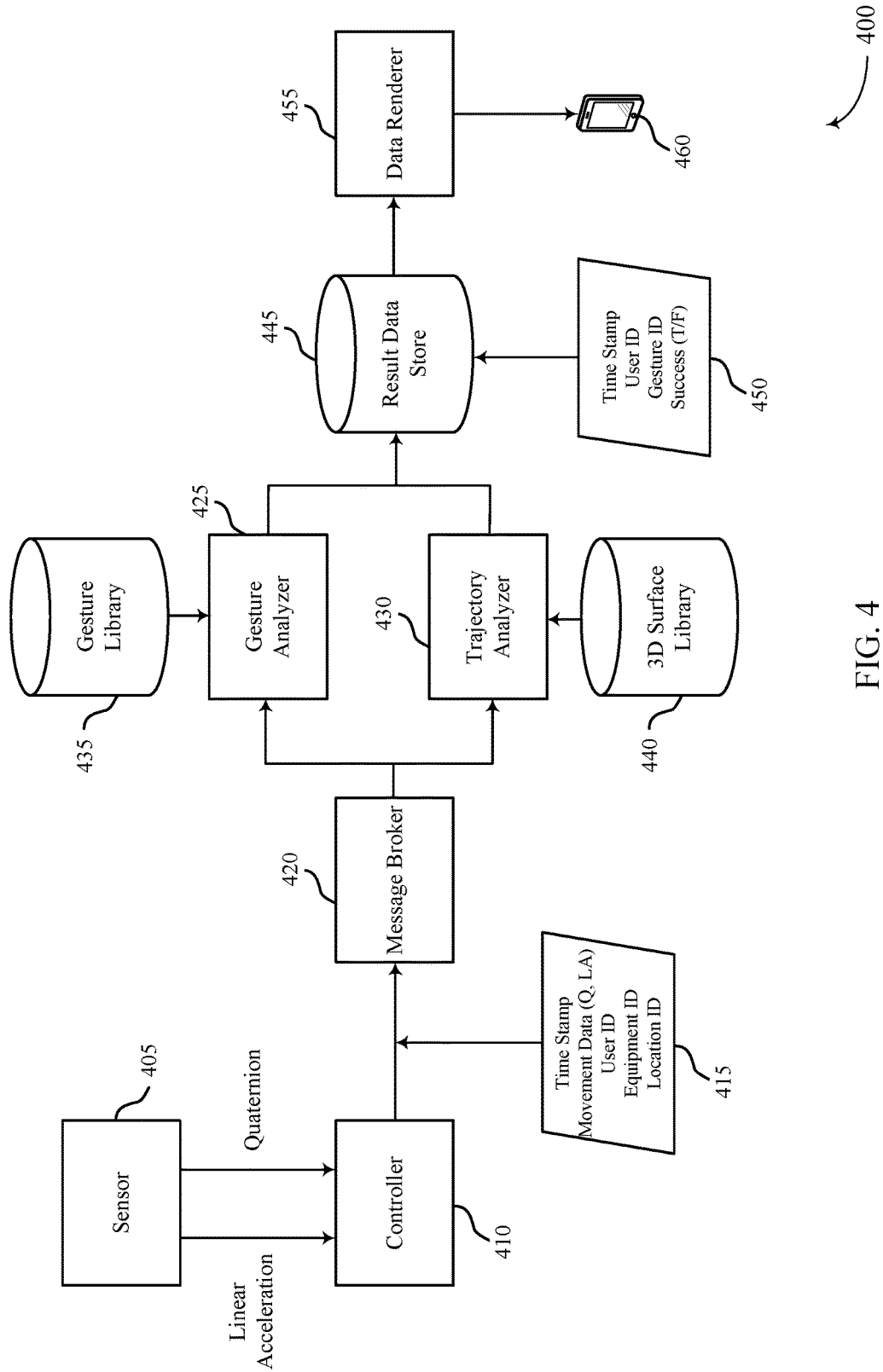
FIG. 4 illustrates an example of a system architecture for automatically evaluating martial arts moves in accordance with aspects of the present disclosure.

FIG. 4 illustrates an example of a system architecture 400 supporting automatic evaluation of martial arts moves in accordance with aspects of the present disclosure. As described in more detail below, devices, modules, or components of system 400 may be examples of devices and their respective components described with reference to FIGS. 1-3.

System 400 may include one or more sensors 405. Sensor 405 may be an example of a nine DOF sensor, as described with reference to FIGS. 1-3, and may be worn by a user (e.g., embedded in a glove or instep guard of a user). The sensor 405 may be configured to transmit linear acceleration and quaternion information to a controller 410. In some examples, the controller 410 may be a processor that is coupled with the sensor 405 (e.g., also embedded in a glove of the user). Additionally or alternatively, the controller 410 may be a component of a computing device (e.g. a server) and the sensor 405 may wirelessly transmit the linear acceleration and quaternion information to the controller 410.

The controller 410 may transmit the data from sensor 405 to a message broker 420. The message broker 420 may be a component of a computing device (e.g., a server). The controller 410 may also append identifying information 415 to the data transmission such as a time stamp, a user ID, equipment ID, location ID, along with the actual movement data. The message broker 420 may be configured to receive signals (e.g., wireless transmissions) from one or more controllers 410 and relay these signals to a computing device for further processing.

For example, the message broker 420 may transmit the motion data from sensor 405 to a trajectory analyzer 430 and a gesture analyzer 425. The trajectory analyzer 430 may be a component or a process of a computing device (e.g., a server). The trajectory analyzer 430 may process linear acceleration data from sensor 405 to determine a trajectory of the sensor 405 worn by a user. From the trajectory analysis, the trajectory analyzer 430 may determine a location of the sensor 405 at various points over the course of a move, in addition to velocity and/or force of the sensor 405.

A three-dimensional surface library 440 may store three-dimensional representations of objects (e.g., a target such as a punching bag) in files. The trajectory analyzer 430 may retrieve a three-dimensional surface from surface library 440 to perform a PIP calculation. For example, the trajectory analyzer 430 may calculate whether and where the sensor 405 struck a target based on comparing a location (e.g., an end point of a move) of the sensor 405 to a three-dimensional surface of an object retrieved from surface library 440.

The gesture analyzer 425 may calculate rotational characteristics of the sensor 405 over the course of a move using quaternion calculations, for example. The gesture analyzer 425 may be a component or a process of a computing device (e.g., a server). The gesture analyzer 425 may combine the rotational characteristics of a motion with the trajectory information determined by trajectory analyzer 430. The gesture analyzer 425 may retrieve a prestored gesture from gesture library 435 to compare a motion of sensor 405 with a prestored motion or model. For example, as described with reference to FIG. 2, a model of a move from an experienced user may be constructed using ML techniques. These models may be stored in gesture library 435 and later used by gesture analyzer 425 to assess whether proper technique was used to perform a particular marital arts move.

The gesture analyzer 425 and trajectory analyzer 430 may transmit respective data to a result data store 445. The result data store 445 may combine the data from the gesture analyzer 425 and the trajectory analyzer 430 and make an evaluation or calculation associated with a martial arts move. For example, the result data store 445 may calculate, based on the trajectory data, whether a point should be awarded to a user corresponding to a move. The result data store 445 may also calculate points as appropriate based on whether proper technique was demonstrated, based on gesture recognition analysis. The result data store 445 may store these determinations and associate them with identification data 450 such as a time stamp, a user ID, a gesture ID, and an indication of a score.

The determinations and calculations from result data store 445 may be transmitted to a data renderer 455. The data renderer 455 may be configured to render any of trajectory data, gesture data, score results, and the like and transmit to a user device 460 for display.

One or more components or devices of FIG. 4 may include memory such as RAM and ROM. The memory may store computer-readable, computer-executable code including instructions that, when executed, cause the processor to perform various functions described herein. In some cases, the memory may contain, among other things, a BIOS which may control basic hardware or software operation such as the interaction with peripheral components or devices. One or more components or devices of FIG. 4 may also include a processor which may include an intelligent hardware device, (e.g., a general-purpose processor, a DSP, a CPU, GPU, a microcontroller, an ASIC, an FPGA, a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to cause the component or device to perform various functions (e.g., functions or tasks supporting automatic evaluation of martial arts moves).

The code may include instructions to implement aspects of the present disclosure, including instructions to support automatic evaluation of martial arts moves. The code may be stored in a non-transitory computer-readable medium such as system memory or other type of memory. In some cases, the code may not be directly executable by the processor but may cause a computer (e.g., when compiled and executed) to perform functions described herein.

Figure 5:
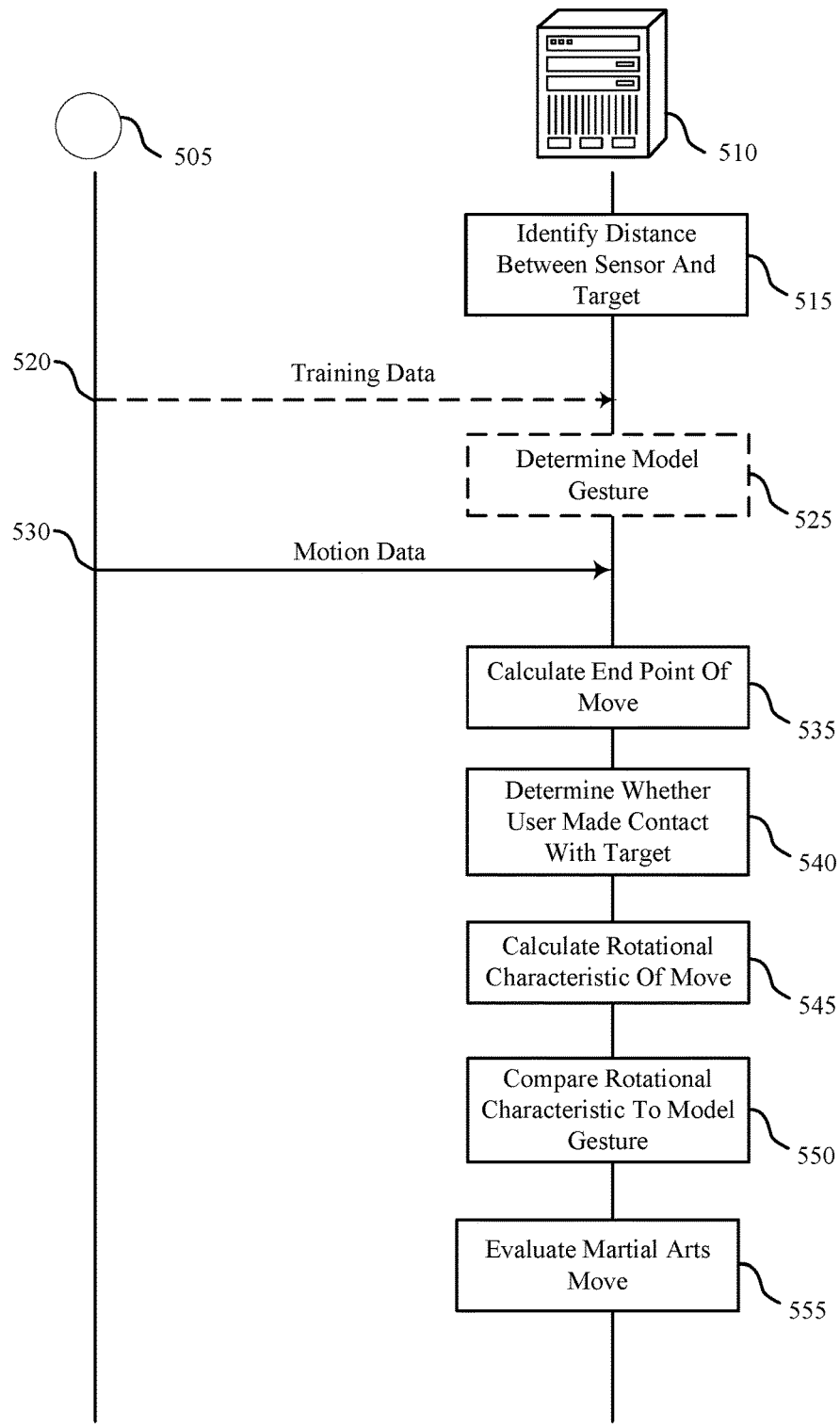
FIG. 5 illustrates an example of a process flow that supports automatically evaluating martial arts moves in accordance with aspects of the present disclosure.

FIG. 5. illustrates an example of a process flow 500 that supports automatic evaluation of a martial arts move in accordance with aspects of the present disclosure. Process flow 500 may include a sensor 505, which may be an example of a sensor 110, 205, 310, or 405 as described with reference to FIGS. 1-4. For example, sensor 505 may be an example of a nine DOF sensor. Sensor 505 may communicate wirelessly or over a wired connection to a computing device 510. The computing device 510 may be an example of the controller 115 or the server 125 described with reference to FIG. 1, or the server 230 described with reference to FIG. 2, or the server 320 described with reference to FIG. 3, or the controller 410 described with reference to FIG. 4. In general, the computing device 510 may be configured to receive signals containing motion data from sensor 505 and process the data to perform an evaluation of a martial arts move in accordance with aspects of the present disclosure.

At 515, the computing device 510 may identify a distance between a target and the sensor 505. In some cases, this distance is input by a user and transmitted to the computing device 510. In some cases, this distance is determined by one or more additional sensors and an image recognition process. For example, as described with reference to FIG. 3, the computing device 510 may receive a video signal of the user wearing the sensor and of the target (e.g., another competitor or a punching bag). Based on the video signal, the computing device 510 may calculate the distance between the sensor 505 and the target using an image analysis of the video signal. For example, the image analysis may be based on a color recognition of clothing worn by the user and a second user (e.g., two opponents). In some cases, the computing device 510 may identify a starting point of the martial arts move in three-dimensional space. This determination may be based on the identified distance between the target and the sensor 505, and one or more additional inputs (e.g., by a user or determined from an image recognition process).

At 520, the sensor 505 may transmit training data to the computing device 510. The training data may be based on motions performed by an authorized user, such as an expert (e.g., a sensei). The training data may include three-dimensional linear acceleration data as a function of time and three-dimensional rotation data as a function of time. The computing device 510 may store a plurality of sets of training motion data received from the authorized user.

At 525, the computing device 510 may further analyze the rotation data from the plurality of sets of training motion data using a machine learning model or machine learning techniques. The computing device 510 may then determine a model gesture corresponding to the martial arts move based on the analysis of the rotation data and/or linear acceleration data, as described with reference to FIG. 2.

At 530, the sensor 505 may detect and transmit motion data to the computing device 510. The motion data may include three-dimensional linear acceleration data as a function of time and three-dimensional rotation data as a function of time. The motion data at 530 may be transmitted from a user other than the authorized user (e.g., at a different time or using a different sensor than the authorized user). For example, the motion data at 530 may be transmitted from a user who is training for a particular martial arts move.

At 535, the computing device 510 may calculate, based on the distance and the three-dimensional linear acceleration data, an end point in three-dimensional space of the martial arts move. This determination may be based on, for example, an integration of the linear acceleration data to determine a trajectory of the sensor 505 as a function of time.

At 540, the computing device 510 may determine whether the user made contact with the target based on a comparison between the end point of the move and a three-dimensional representation of the target. In some examples, the computing device 510 may determine whether the user came within a threshold distance (e.g., nearly contacted) the target. This determination may be based on a PIP calculation that determines whether the end point of the move falls within or is on a boundary of the three-dimensional representation of the target. In some examples, the computing device 510 may receive the three-dimensional representation of the target from a surface library. In some examples, the computing device 510 may determine a contact location on the target based on the end point of the move and the three-dimensional representation of the target. This contact location may be an example of a zone on the target (e.g., a region of a punching bag). The computing device 510 may also calculate a force exerted on the target at the contact location based on the linear acceleration data received from the sensor 505.

At 545, the computing device 510 may calculate a rotational characteristic of the martial arts move based on the received rotation data. The rotation characteristic calculation may include performing quaternion calculations on the rotation data. In some examples, the rotational characteristic of the martial arts move may include an indicate of a rotational orientation of a hand of the user as a function of time.

At 550, the computing device 510 may compare the rotational characteristic of the martial arts move to a stored model gesture corresponding to the martial arts move. For example, the computing device 510 may determine a statistical variance between the calculated rotational characteristic of the martial arts move and a rotational characteristic from the stored model gesture. The computing device 510 may retrieve the stored model gesture from a gesture library in some cases.

At 555, the computing device 510 may evaluate the martial arts move based on whether the user made contact with the target and the comparison of the rotational characteristic. The computing device 510 may also evaluate the martial arts move based on the calculated contact location on the target, the calculated force at the contact region, or some combination of these factors in addition to whether the user made contact and the rotational characteristic comparison. In some examples, the evaluation of the martial arts move may be in the form of a score.

The computing device 510 may then transmit an indication of the evaluation of the martial arts move. For example, the computing device 510 may transmit the indication to another computing device or to a module that renders the score or evaluation for display to a user.

Figure 6:
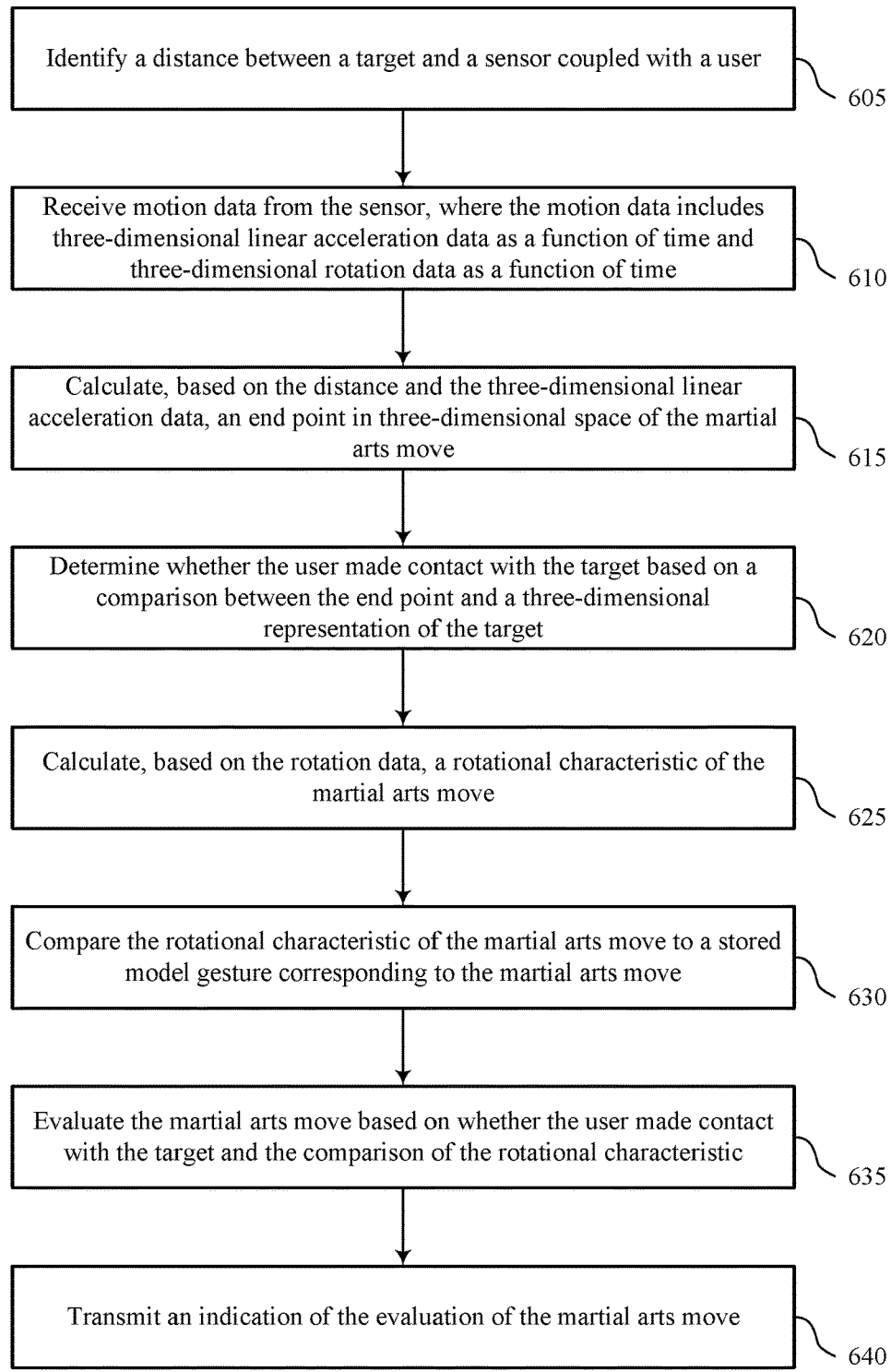
FIGS. 6 and 7 show flowcharts illustrating methods that support automatically evaluating martial arts moves in accordance with aspects of the present disclosure.

FIG. 6 shows a flowchart illustrating a method 600 that supports a system for automatic evaluation of martial arts moves in accordance with aspects of the present disclosure. The operations of method 600 may be implemented by a computer device or its components as described herein. For example, the operations of method 600 may be performed by one or more components described with reference to FIG. 4 or a computing device as described with reference to FIG. 5. In some examples, a computer device may execute a set of instructions to control the functional elements of the computer device to perform the functions described below. Additionally or alternatively, a computer device may perform aspects of the functions described below using special-purpose hardware.

At 605, the computer device may identify a distance between a target and a sensor coupled with a user. The operations of 605 may be performed according to the methods described herein. In some examples, aspects of the operations of 605 may be performed by a controller described with reference to FIG. 4.

At 610, the computer device may receive motion data from the sensor, where the motion data includes three-dimensional linear acceleration data as a function of time and three-dimensional rotation data as a function of time. The operations of 610 may be performed according to the methods described herein. In some examples, aspects of the operations of 610 may be performed by a controller described with reference to FIG. 4.

At 615, the computer device may calculate, based on the distance and the three-dimensional linear acceleration data, an end point in three-dimensional space of the martial arts move. The operations of 615 may be performed according to the methods described herein. In some examples, aspects of the operations of 615 may be performed by a trajectory analyzer as described with reference to FIG. 4.

At 620, the computer device may determine whether the user made contact with the target based on a comparison between the end point and a three-dimensional representation of the target. The operations of 620 may be performed according to the methods described herein. In some examples, aspects of the operations of 620 may be performed by a trajectory analyzer as described with reference to FIG. 4.

At 625, the computer device may calculate, based on the rotation data, a rotational characteristic of the martial arts move. The operations of 625 may be performed according to the methods described herein. In some examples, aspects of the operations of 625 may be performed by a gesture analyzer as described with reference to FIG. 4.

At 630, the computer device may compare the rotational characteristic of the martial arts move to a stored model gesture corresponding to the martial arts move. The operations of 630 may be performed according to the methods described herein. In some examples, aspects of the operations of 630 may be performed by a gesture analyzer as described with reference to FIG. 4.

At 635, the computer device may evaluate the martial arts move based on whether the user made contact with the target and the comparison of the rotational characteristic. The operations of 635 may be performed according to the methods described herein. In some examples, aspects of the operations of 635 may be performed by a result data store as described with reference to FIG. 4.

At 640, the computer device may transmit an indication of the evaluation of the martial arts move. The operations of 640 may be performed according to the methods described herein. In some examples, aspects of the operations of 640 may be performed by result data store or a data renderer as described with reference to FIG. 4.

Figure 7:
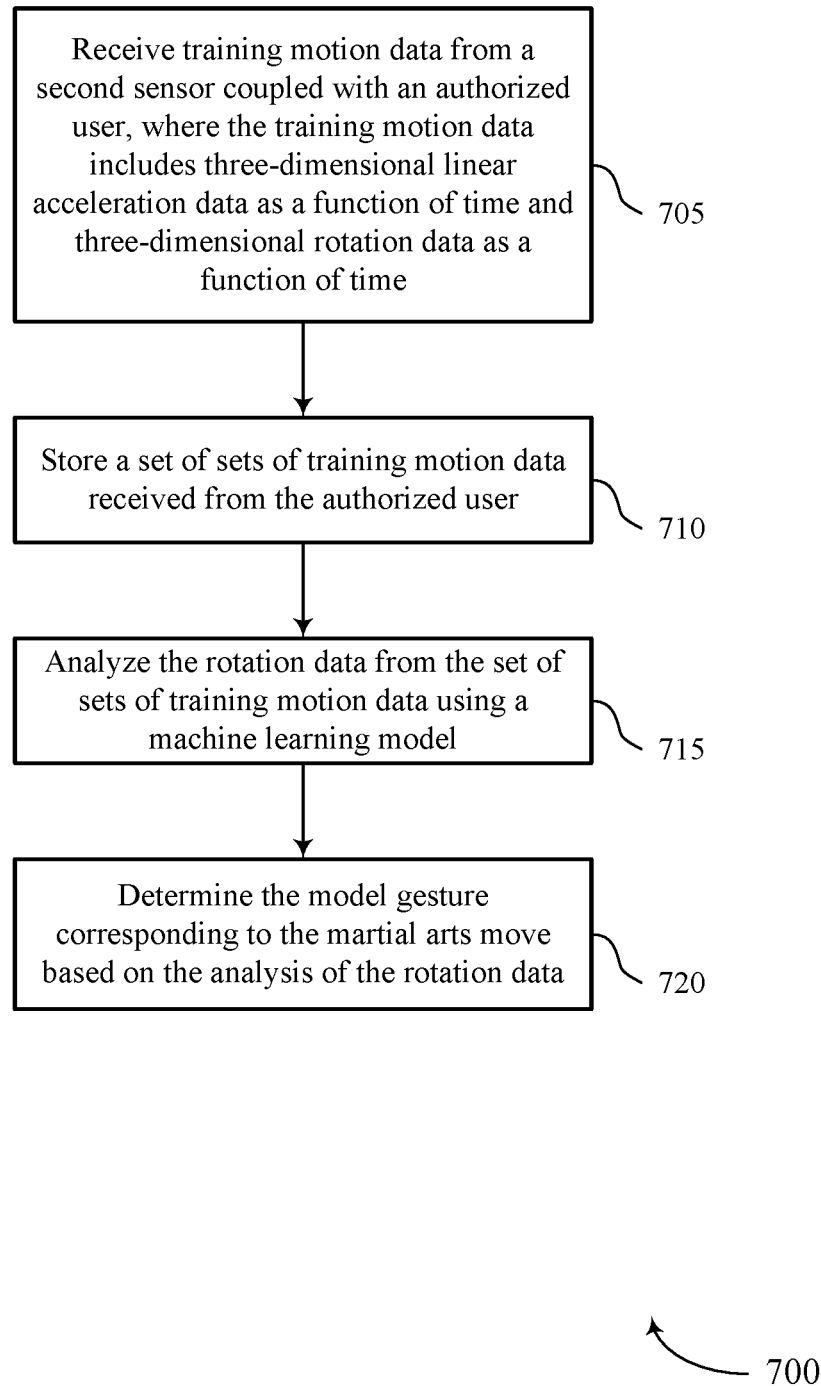

FIG. 7 shows a flowchart illustrating a method 700 that supports a system for automatic evaluation of martial arts moves in accordance with aspects of the present disclosure. The operations of method 700 may be implemented by a computer device or its components as described herein. For example, the operations of method 700 may be performed by one or more components described with reference to FIG. 4 or a computing device as described with reference to FIG. 5. In some examples, a computer device may execute a set of instructions to control the functional elements of the computer device to perform the functions described below. Additionally or alternatively, a computer device may perform aspects of the functions described below using special-purpose hardware.

At 705, the computer device may receive training motion data from a second sensor coupled with an authorized user, where the training motion data includes three-dimensional linear acceleration data as a function of time and three-dimensional rotation data as a function of time. The operations of 705 may be performed according to the methods described herein. In some examples, aspects of the operations of 705 may be performed by a controller described with reference to FIG. 4.

At 710, the computer device may store a set of sets of training motion data received from the authorized user. The operations of 710 may be performed according to the methods described herein. In some examples, aspects of the operations of 710 may be performed by a gesture analyzer as described with reference to FIG. 4.

At 715, the computer device may analyze the rotation data from the set of sets of training motion data using a machine learning model. The operations of 715 may be performed according to the methods described herein. In some examples, aspects of the operations of 715 may be performed by a gesture analyzer as described with reference to FIG. 4.

At 720, the computer device may determine the model gesture corresponding to the martial arts move based on the analysis of the rotation data. The operations of 720 may be performed according to the methods described herein. In some examples, aspects of the operations of 720 may be performed by a gesture analyzer as described with reference to FIG. 4.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and medical servers are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). A processor may in some cases be in electronic communication with a memory, where the memory stores instructions that are executable by the processor. Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B. or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of evaluating a martial arts move, comprising:
   identifying a distance between a target and a nine degree of freedom (DOF) sensor coupled with a user;
   receiving motion data from the nine DOF sensor, wherein the motion data comprises three-dimensional linear acceleration data as a function of time and three-dimensional rotation data as a function of time;
   calculating, based at least in part on the distance and the three-dimensional linear acceleration data, an end point in three-dimensional space of the martial arts move;
   determining whether the user made contact with the target based at least in part on a comparison between the end point and a three-dimensional representation of the target;
   calculating, based at least in part on the three-dimensional rotation data, a rotational characteristic of the martial arts move;
   comparing the rotational characteristic of the martial arts move to a stored model gesture corresponding to the martial arts move;
   evaluating the martial arts move based at least in part on whether the user made contact with the target and the comparison of the rotational characteristic; and
   transmitting an indication of the evaluation of the martial arts move to a user device.

2. The method of claim 1, further comprising:
   receiving training motion data from a second nine DOF sensor coupled with an authorized user, wherein the training motion data comprises training three-dimensional linear acceleration data as a function of time and training three-dimensional rotation data as a function of time;
   storing a plurality of sets of training motion data received from the authorized user;
   analyzing the training three-dimensional rotation data from the plurality of sets of training motion data using a machine learning model; and
   determining the stored model gesture corresponding to the martial arts move based at least in part on the analysis of the training three-dimensional rotation data.

3. The method of claim 1, further comprising:
   determining a contact location on the target based at least in part on the end point and the three-dimensional representation of the target.

4. The method of claim 3, wherein evaluating the martial arts move is further based at least in part on the contact location on the target.

5. The method of claim 3, further comprising:
   calculating a force exerted on the target at the contact location based at least in part on the three-dimensional linear acceleration data.

6. The method of claim 5, wherein evaluating the martial arts move is further based at least in part on the force.

7. The method of claim 1, wherein identifying the distance between the target and the nine DOF sensor comprises:
   receiving a video signal of the user and the target; and
   calculating the distance based at least in part on an image analysis of the video signal.

8. The method of claim 7, wherein the target is a second user, and wherein the image analysis is based at least in part on a color recognition of clothing worn by the user and the second user.

9. The method of claim 1, further comprising:
   retrieving the three-dimensional representation of the target from a surface library.

10. The method of claim 1, further comprising:
    retrieving the stored model gesture from a gesture library.

11. The method of claim 1, wherein the motion data is received via a wireless data connection.

12. The method of claim 1, wherein the three-dimensional rotation data comprises quaternion data.

13. The method of claim 1, wherein the rotational characteristic of the martial arts move comprises an indication of a rotational orientation of a hand of the user as a function of time.

14. The method of claim 1, wherein the martial arts move comprises a punch, a kick, or a combination thereof.

15. The method of claim 1, wherein the indication of the evaluation of the martial arts move comprises a score.

16. The method of claim 1, further comprising:
    receiving an identification of the user, an identification of the nine DOF sensor, a timestamp, or a combination thereof.

17. The method of claim 1, wherein the determining whether the user made contact with the target comprises a point in polyhedron calculation.

18. The method of claim 1, further comprising:
    identifying a starting point in three-dimensional space of the martial arts move.

* * * * *